US007885745B2

(12) United States Patent
McClure et al.

(10) Patent No.: US 7,885,745 B2
(45) Date of Patent: Feb. 8, 2011

(54) GNSS CONTROL SYSTEM AND METHOD

(75) Inventors: John A. McClure, Scottsdale, AZ (US);
Richard W. Heiniger, Parkville, MO (US); Kent D. Funk, Robinson, KS (US); John T. E. Timm, Phoenix, AZ (US); Richard B. Wong, Phoenix, AZ (US); Dennis M. Collins, Fountain Hills, AZ (US)

(73) Assignee: Hemisphere GPS LLC, Calgary (CA)

( * ) Notice: Subject to any disclaimer, the term of this patent is extended or adjusted under 35 U.S.C. 154(b) by 981 days.

(21) Appl. No.: 11/700,501

(22) Filed: Jan. 31, 2007

(65) Prior Publication Data
US 2007/0198185 A1  Aug. 23, 2007

Related U.S. Application Data

(63) Continuation-in-part of application No. 11/184,657, filed on Jul. 19, 2005, now Pat. No. 7,689,354, which is a continuation-in-part of application No. 10/875,776, filed on Jun. 24, 2004, now Pat. No. 7,142,956, which is a continuation-in-part of application No. 10/804,721, filed on Mar. 19, 2004, now Pat. No. 7,437,230, which is a continuation-in-part of application No. 10/804,758, filed on Mar. 19, 2004, now Pat. No. 7,400,956, which is a continuation-in-part of application No. 11/650,784, filed on Jan. 8, 2007, now Pat. No. 7,373,231, which is a continuation of application No. 10/733,960, filed on Dec. 11, 2003, now Pat. No. 7,162,348.

(60) Provisional application No. 60/456,130, filed on Mar. 20, 2003, provisional application No. 60/456,146, filed on Mar. 20, 2003, provisional application No. 60/432,719, filed on Dec. 11, 2002.

(51) Int. Cl.
G06F 7/70    (2006.01)
G06F 7/76    (2006.01)
G06G 7/00    (2006.01)

(52) U.S. Cl. .................. 701/50; 701/200; 701/202; 701/203; 701/205; 701/207; 701/208; 701/209; 701/211; 701/212; 701/213; 701/214; 701/216; 701/220

(58) Field of Classification Search .................. None
See application file for complete search history.

(56) References Cited

U.S. PATENT DOCUMENTS 3,585,537 A    6/1971 Rennick et al.
(Continued)

FOREIGN PATENT DOCUMENTS

JP    07244150    9/1995
(Continued)

OTHER PUBLICATIONS

Takac, Frank et al., "SmartRTK: A Novel Method Of Processing Standardised RTCM Network RTK Information For High Precision Positioning", *Proceedings of ENC GNSS 2008*, Toulouse, France,(Apr. 22, 2008).

(Continued)

*Primary Examiner*—Khoi Tran
*Assistant Examiner*—Bhavesh V Amin
(74) *Attorney, Agent, or Firm*—Law Offices of Mark Brown LLC; Mark E. Brown

(57) ABSTRACT

A GNSS control system and method are provided for guiding, navigating and controlling a motive component, such as a tractor, and a working component, such as an implement. A vector position/heading sensor is mounted on the motive component and includes multiple antennas connected to a GNSS receiver. The sensor also includes inertial sensors and a direction sensor, which are connected to a microprocessor of a steering control module (SCM). The SCM can be hot swapped among different vehicles and can interface with their respective original, onboard control systems. The implement can be provided with an optional GNSS antenna, receiver or both, and can be guided independently of the motive component. The SCM can be preprogrammed to guide the vehicle over a field in operating modes including straight line, contour, concentric circle and point+direction. A spray boom with multiple nozzles can be installed on the implement and the nozzles can be independently activated based upon a location of the implement as determined from a log of GNSS data.

13 Claims, 7 Drawing Sheets

U.S. PATENT DOCUMENTS

| | | |
|---|---|---|
| 3,596,228 A | 7/1971 | Reed, Jr. et al. |
| 3,727,710 A | 4/1973 | Sanders et al. |
| 3,815,272 A | 6/1974 | Marleau |
| 3,899,028 A | 8/1975 | Morris et al. |
| 3,987,456 A | 10/1976 | Gelin |
| 4,132,272 A | 1/1979 | Holloway et al. |
| 4,170,776 A | 10/1979 | MacDoran et al. |
| 4,180,133 A | 12/1979 | Collogan et al. |
| 4,398,162 A | 8/1983 | Nagai |
| 4,453,614 A | 6/1984 | Allen et al. |
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |
| 4,710,775 A | 12/1987 | Coe |
| 4,714,435 A | 12/1987 | Stipanuk et al. |
| 4,739,448 A | 4/1988 | Rowe et al. |
| 4,751,512 A | 6/1988 | Longaker |
| 4,769,700 A | 9/1988 | Pryor |
| 4,785,463 A | 11/1988 | Janc et al. |
| 4,802,545 A | 2/1989 | Nystuen et al. |
| 4,812,991 A | 3/1989 | Hatch |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalia |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Krytsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland et al. |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen |
| 5,664,632 A | 9/1997 | Frasier |
| 5,673,491 A * | 10/1997 | Brenna et al. ............ 33/366.24 |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cozenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,906,645 A * | 5/1999 | Kagawa et al. ................ 701/23 |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A * | 7/1999 | Greatline et al. ............... 701/50 |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |

| | | | | | | |
|---|---|---|---|---|---|---|
| 5,943,008 | A | 8/1999 | Van Dusseldorp | 6,542,077 B2 | 4/2003 | Joao |
| 5,944,770 | A | 8/1999 | Enge et al. | 6,549,835 B2 | 4/2003 | Deguchi |
| 5,945,917 | A | 8/1999 | Harry | 6,553,299 B1 | 4/2003 | Keller et al. |
| 5,949,371 | A | 9/1999 | Nichols | 6,553,300 B2 | 4/2003 | Ma et al. |
| 5,955,973 | A | 9/1999 | Anderson | 6,553,311 B2 | 4/2003 | Ahearn et al. |
| 5,956,250 | A | 9/1999 | Gudat et al. | 6,570,534 B2 | 5/2003 | Cohen et al. |
| 5,969,670 | A | 10/1999 | Kalafus et al. | 6,577,952 B2 | 6/2003 | Geier et al. |
| 5,987,383 | A * | 11/1999 | Keller et al. ............ 701/213 | 6,587,761 B2 | 7/2003 | Kumar |
| 6,014,101 | A | 1/2000 | Loomis | 6,606,542 B2 | 8/2003 | Hauwiller et al. |
| 6,014,608 | A | 1/2000 | Seo | 6,611,228 B2 | 8/2003 | Toda et al. |
| 6,018,313 | A | 1/2000 | Englemayer et al. | 6,611,754 B2 | 8/2003 | Klein |
| 6,023,239 | A | 2/2000 | Kovach | 6,611,755 B1 | 8/2003 | Coffee et al. |
| 6,052,647 | A | 4/2000 | Parkinson et al. | 6,622,091 B2 | 9/2003 | Perlmutter et al. |
| 6,055,477 | A | 4/2000 | McBurney et al. | 6,631,916 B1 | 10/2003 | Miller |
| 6,057,800 | A | 5/2000 | Yang et al. | 6,643,576 B1 | 11/2003 | O'Connor et al. |
| 6,061,390 | A | 5/2000 | Meehan et al. | 6,646,603 B2 | 11/2003 | Dooley |
| 6,061,632 | A | 5/2000 | Dreier | 6,657,875 B1 | 12/2003 | Zeng et al. |
| 6,062,317 | A | 5/2000 | Gharsalli | 6,671,587 B2 | 12/2003 | Hrovat et al. |
| 6,069,583 | A | 5/2000 | Silvestrin et al. | 6,688,403 B2 | 2/2004 | Bernhardt et al. |
| 6,076,612 | A | 6/2000 | Carr et al. | 6,703,973 B1 | 3/2004 | Nichols |
| 6,081,171 | A | 6/2000 | Ella | 6,711,501 B2 | 3/2004 | McClure et al. |
| 6,100,842 | A | 8/2000 | Dreier et al. | 6,721,638 B2 | 4/2004 | Zeitler |
| 6,122,595 | A | 9/2000 | Varley et al. | 6,732,024 B2 | 5/2004 | Rekow et al. |
| 6,128,574 | A | 10/2000 | Diekhans | 6,744,404 B1 | 6/2004 | Whitehead et al. |
| 6,144,335 | A | 11/2000 | Rogers | 6,754,584 B2 | 6/2004 | Pinto et al. |
| 6,191,730 | B1 | 2/2001 | Nelson, Jr. | 6,774,843 B2 | 8/2004 | Takahashi |
| 6,191,733 | B1 | 2/2001 | Dizchavez | 6,792,380 B2 | 9/2004 | Toda |
| 6,198,430 | B1 | 3/2001 | Hwang et al. | 6,819,269 B2 | 11/2004 | Flick |
| 6,198,992 | B1 | 3/2001 | Winslow | 6,822,314 B2 | 11/2004 | Beasom |
| 6,199,000 | B1 * | 3/2001 | Keller et al. ............ 701/50 | 6,865,465 B2 | 3/2005 | McClure |
| 6,205,401 | B1 | 3/2001 | Pickhard et al. | 6,865,484 B2 | 3/2005 | Miyasaka et al. |
| 6,215,828 | B1 | 4/2001 | Signell et al. | 6,900,992 B2 | 5/2005 | Kelly et al. |
| 6,229,479 | B1 | 5/2001 | Kozlov et al. | 6,922,635 B2 | 7/2005 | Rorabaugh |
| 6,230,097 | B1 | 5/2001 | Dance et al. | 6,931,233 B1 | 8/2005 | Tso et al. |
| 6,233,511 | B1 | 5/2001 | Berger et al. | 6,967,538 B2 | 11/2005 | Woo |
| 6,236,916 | B1 | 5/2001 | Staub et al. | 6,990,399 B2 | 1/2006 | Hrazdera et al. |
| 6,236,924 | B1 | 5/2001 | Motz | 7,006,032 B2 | 2/2006 | King et al. |
| 6,253,160 | B1 | 6/2001 | Hanseder | 7,026,982 B2 | 4/2006 | Toda et al. |
| 6,256,583 | B1 | 7/2001 | Sutton | 7,027,918 B2 | 4/2006 | Zimmerman et al. |
| 6,259,398 | B1 | 7/2001 | Riley | 7,031,725 B2 | 4/2006 | Rorabaugh |
| 6,266,595 | B1 | 7/2001 | Greatline et al. | 7,089,099 B2 | 8/2006 | Shostak et al. |
| 6,285,320 | B1 | 9/2001 | Olster et al. | 7,142,956 B2 | 11/2006 | Heiniger et al. |
| 6,292,132 | B1 | 9/2001 | Wilson | 7,162,348 B2 | 1/2007 | McClure et al. |
| 6,307,505 | B1 | 10/2001 | Green | 7,191,061 B2 | 3/2007 | McKay et al. |
| 6,313,788 | B1 | 11/2001 | Wilson | 7,231,290 B2 | 6/2007 | Steichen et al. |
| 6,314,348 | B1 | 11/2001 | Winslow | 7,248,211 B2 | 7/2007 | Hatch et al. |
| 6,325,684 | B1 | 12/2001 | Knight | 7,271,766 B2 | 9/2007 | Zimmerman et al. |
| 6,336,066 | B1 | 1/2002 | Pellenc et al. | 7,277,784 B2 | 10/2007 | Weiss |
| 6,345,231 | B2 | 2/2002 | Quincke | 7,292,186 B2 | 11/2007 | Miller et al. |
| 6,356,602 | B1 | 3/2002 | Rodal et al. | 7,324,915 B2 | 1/2008 | Altman |
| 6,377,889 | B1 | 4/2002 | Soest | 7,358,896 B2 | 4/2008 | Gradincic et al. |
| 6,380,888 | B1 | 4/2002 | Kucik | 7,373,231 B2 | 5/2008 | McClure et al. |
| 6,389,345 | B2 | 5/2002 | Phelps | 7,388,539 B2 | 6/2008 | Whitehead et al. |
| 6,392,589 | B1 | 5/2002 | Rogers et al. | 7,395,769 B2 | 7/2008 | Jensen |
| 6,397,147 | B1 | 5/2002 | Whitehead | 7,428,259 B2 | 9/2008 | Wang et al. |
| 6,415,229 | B1 | 7/2002 | Diekhans | 7,437,230 B2 | 10/2008 | McClure et al. |
| 6,418,031 | B1 | 7/2002 | Archambeault | 7,451,030 B2 | 11/2008 | Eglington et al. |
| 6,421,003 | B1 | 7/2002 | Riley et al. | 7,479,900 B2 | 1/2009 | Horstemeyer |
| 6,424,915 | B1 | 7/2002 | Fukuda et al. | 7,505,848 B2 | 3/2009 | Flann et al. |
| 6,431,576 | B1 | 8/2002 | Viaud et al. | 7,522,100 B2 | 4/2009 | Yang et al. |
| 6,434,462 | B1 * | 8/2002 | Bevly et al. ............ 701/50 | 7,571,029 B2 | 8/2009 | Dai et al. |
| 6,445,983 | B1 | 9/2002 | Dickson et al. | 7,689,354 B2 | 3/2010 | Heiniger et al. |
| 6,445,990 | B1 | 9/2002 | Manring | 2003/0014171 A1 | 1/2003 | Ma et al. |
| 6,449,558 | B1 | 9/2002 | Small | 2003/0187560 A1 | 10/2003 | Keller et al. |
| 6,463,091 | B1 | 10/2002 | Zhodzicshsky et al. | 2003/0208319 A1 | 11/2003 | Ell et al. |
| 6,463,374 | B1 | 10/2002 | Keller et al. | 2004/0039514 A1 | 2/2004 | Steichen et al. |
| 6,466,871 | B1 | 10/2002 | Reisman et al. | 2004/0212533 A1 | 10/2004 | Whitehead |
| 6,469,663 | B1 | 10/2002 | Whitehead et al. | 2005/0080559 A1 | 4/2005 | Ishibashi et al. |
| 6,484,097 | B2 | 11/2002 | Fuchs et al. | 2005/0225955 A1 | 10/2005 | Grebenkemper et al. |
| 6,501,422 | B1 | 12/2002 | Nichols | 2005/0265494 A1 | 12/2005 | Goodlings |
| 6,515,619 | B1 | 2/2003 | McKay, Jr. | 2006/0167600 A1 | 7/2006 | Nelson et al. |
| 6,516,271 | B2 | 2/2003 | Upadhyaya et al. | 2006/0215739 A1 | 9/2006 | Williamson et al. |
| 6,539,303 | B2 | 3/2003 | McClure et al. | 2007/0078570 A1 | 4/2007 | Dai et al. |

| | | |
|---|---|---|
| 2007/0088447 A1 | 4/2007 | Stothert et al. |
| 2007/0121708 A1 | 5/2007 | Simpson |
| 2007/0205940 A1 | 9/2007 | Yang et al. |
| 2007/0285308 A1 | 12/2007 | Bauregger et al. |
| 2008/0129586 A1 | 6/2008 | Martin |
| 2008/0204312 A1 | 8/2008 | Euler |
| 2009/0171583 A1 | 7/2009 | DiEsposti |
| 2009/0174597 A1 | 7/2009 | DiLellio et al. |
| 2009/0174622 A1 | 7/2009 | Kanou |
| 2009/0177395 A1 | 7/2009 | Stelpstra |
| 2009/0177399 A1 | 7/2009 | Park et al. |
| 2009/0259397 A1 | 10/2009 | Stanton |
| 2009/0259707 A1 | 10/2009 | Martin et al. |
| 2009/0262014 A1 | 10/2009 | DiEsposti |
| 2009/0262018 A1 | 10/2009 | Vasilyev et al. |
| 2009/0262974 A1 | 10/2009 | Lithopoulos |
| 2009/0265054 A1 | 10/2009 | Basnayake |
| 2009/0265101 A1 | 10/2009 | Jow |
| 2009/0265104 A1 | 10/2009 | Shroff |
| 2009/0273372 A1 | 11/2009 | Brenner |
| 2009/0273513 A1 | 11/2009 | Huang |
| 2009/0274079 A1 | 11/2009 | Bhatia et al. |
| 2009/0274113 A1 | 11/2009 | Katz |
| 2009/0276155 A1 | 11/2009 | Jeerage et al. |
| 2009/0295633 A1 | 12/2009 | Pinto et al. |
| 2009/0295634 A1 | 12/2009 | Yu et al. |
| 2009/0299550 A1 | 12/2009 | Baker |
| 2009/0322597 A1 | 12/2009 | Medina Herrero et al. |
| 2009/0322598 A1 | 12/2009 | Fly et al. |
| 2009/0322600 A1 | 12/2009 | Whitehead et al. |
| 2009/0322601 A1 | 12/2009 | Ladd et al. |
| 2009/0322606 A1 | 12/2009 | Gronemeyer |
| 2009/0326809 A1 | 12/2009 | Colley et al. |
| 2010/0013703 A1 | 1/2010 | Tekawy et al. |
| 2010/0026569 A1 | 2/2010 | Amidi |
| 2010/0030470 A1 | 2/2010 | Wang et al. |
| 2010/0039316 A1 | 2/2010 | Gronemeyer et al. |
| 2010/0039318 A1 | 2/2010 | Kmiecik |
| 2010/0039320 A1 | 2/2010 | Boyer et al. |
| 2010/0039321 A1 | 2/2010 | Abraham |
| 2010/0060518 A1 | 3/2010 | Bar-Sever et al. |
| 2010/0063649 A1 | 3/2010 | Wu |
| 2010/0084147 A1 | 4/2010 | Aral |
| 2010/0085249 A1 | 4/2010 | Ferguson et al. |
| 2010/0085253 A1 | 4/2010 | Ferguson et al. |
| 2010/0103033 A1 | 4/2010 | Roh |
| 2010/0103034 A1 | 4/2010 | Tobe et al. |
| 2010/0103038 A1 | 4/2010 | Yeh et al. |
| 2010/0103040 A1 | 4/2010 | Broadbent |
| 2010/0106414 A1 | 4/2010 | Whitehead |
| 2010/0106445 A1 | 4/2010 | Kondoh |
| 2010/0109944 A1 | 5/2010 | Whitehead et al. |
| 2010/0109945 A1 | 5/2010 | Roh |
| 2010/0109947 A1 | 5/2010 | Rintanen |
| 2010/0109948 A1 | 5/2010 | Razoumov et al. |
| 2010/0109950 A1 | 5/2010 | Roh |
| 2010/0111372 A1 | 5/2010 | Zheng et al. |
| 2010/0114483 A1 | 5/2010 | Heo et al. |
| 2010/0117894 A1 | 5/2010 | Velde et al. |
| 2010/0117899 A1 | 5/2010 | Papadimitratos et al. |
| 2010/0117900 A1 | 5/2010 | van Diggelen et al. |
| 2010/0124210 A1 | 5/2010 | Lo |
| 2010/0124212 A1 | 5/2010 | Lo |
| 2010/0134354 A1 | 6/2010 | Lennen |
| 2010/0149030 A1 | 6/2010 | Verma et al. |
| 2010/0152949 A1 | 6/2010 | Nunan et al. |
| 2010/0156709 A1 | 6/2010 | Zhang et al. |
| 2010/0156712 A1 | 6/2010 | Pisz et al. |
| 2010/0156718 A1 | 6/2010 | Chen |
| 2010/0159943 A1 | 6/2010 | Salmon |
| 2010/0161179 A1 | 6/2010 | McClure et al. |
| 2010/0161211 A1 | 6/2010 | Chang |
| 2010/0161568 A1 | 6/2010 | Xiao |

FOREIGN PATENT DOCUMENTS

| | | |
|---|---|---|
| WO | WO9836288 | 8/1998 |
| WO | WO0024239 | 5/2000 |
| WO | WO03019430 | 3/2003 |
| WO | WO2005/119386 | 12/2005 |
| WO | WO2009/066183 | 5/2009 |
| WO | WO2009126587 | 10/2009 |
| WO | WO2009/148638 | 12/2009 |

OTHER PUBLICATIONS

"International Search Report," PCT/US09/34376, (Nov. 2, 2009).
"International Search Report / Written Opinion", PCT/US09/63594.
"International Search Report", PCT/US09/60668.
Parkinson, Bradford W., et al., "Global Positioning System: Theory and Applications, vol. II" Bradford W. Parkinson and James J. Spiker, Jr., eds., *Global Positioning System: Theory and Applications*, vol. II, 1995, AIAA, Reston, VA, USA, pp. 3-50, (1995),3-50.
"Orthman Manufacturing Co., www.orthman.com/htm;guidance.htm", 2004, regarding the "Tracer Quick-Hitch".
Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Papers* vol. 1, Monetrey, California American Institute of Aeronautics and Astronautics, Inc., (May 2004), 136-143.
Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware (EH'02)*, (2002).
Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) *John Wiley & Sons, Inc.*
Park, Chansik et al., "Integer Ambiguity Resolution for GPS Based Attitude Determination System", *SICE '09*, Jul. 29-31, Chiba, 1115-1120.
Last, J. D., et al., "Effect of skywave interference on coverage of radiobeacon DGPS stations", *IEEE Proc.-Radar, Sonar Navig.*, vol. 144, No. 3, Jun. 1997, pp. 163-168.
"International Search Report and Written Opinion", PCT/US2004/015678, filed May 17, 2004, mailed Jun. 21, 2005.
"ISO", 11783 Part 7 Draft Amendment 1 Annex, Paragraphs B.6 and B.7.ISO 11783-7 2004 DAM1, ISO: Mar. 8, 2004.
Kaplan, E D., "Understanding GPS: Principles and Applications", *Artech House*, MA, 1996.
Irsigler, M et al., "PPL Tracking Performance in the Presence of Oscillator Phase Noise", *GPS Solutions*, vol. 5, No. 4, pp. 45-57 (2002).
Ward, Phillip W., "Performance Comparisons Between FLL, PLL and a Novel FLL-Assisted-PLL Carrier Tracking Loop Under RF Interference Conditions", *11th Int. Tech Meeting of the Satellite Division of the U.S. Inst. of Navigation*, Nashville, TN, Sep. 15-18, 783-795, 1998.
Bevly, David M., "Comparison of INS v. Carrier-Phase DGPS for Attitude Determination in the Control of Off-Road Vehicles", *ION 55th Annual Meeting*; Jun. 28-30, 1999; Cambridge, Massachusetts; pp. 497-504.
Keicher, R. et al., "Automatic Guidance for Agricultural Vehicles in Europe", *Computers and Electronics in Agriculture*, vol. 25, (Jan. 2000),169-194.
"International Search Report", PCT/US09/479976,, (Aug. 11, 2009).
"International Search Report", PCT/AU/2008/000002, (Feb. 28, 2008).
"International Search Report", PCT/US09/33693, (Mar. 30, 2009).
"International Search Report", PCT/US09/039686, (May 26, 2009).
"International Search Report", PCT/US09/33567, (Feb. 9, 2009).
"International Search Report and Written Opinion", PCT/IB2008/003796, (Jul. 15, 2009).
"International Search Report", PCT/US09/067693, (Jan. 26, 2010).

"International Search Report and Written Opinion" PCT/US10/21334, (Mar. 12, 2010).

Rho, Hyundho et al., "Dual-Frequency GPS Precise Point Positioning with WADGPS Corrections", [retrieved on May 18, 2010]. Retrieved from the Internet: URL: http://gauss.gge.unb.ca/papers.pdf/iongnss2005.rho.wadgps.pdf, (Jul. 12, 2006).

"Eurocontrol, Pegasus Technical Notes on SBAS", report [online], Dec. 7, 2004 [retrieved on May 18, 2010]. Retrieved from the Internet: <URL: http://www.icao.int/icao/en/ro/nacc/meetings/2004/gnss/documentation/Pegasus/tn.pdf>. (Dec. 7, 2004), p. 89 paras [0001]-[0004].

"Arinc Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, (Dec. 7, 2004), p. 168 para [0001].

Schaer, et al., "Determination and Use of GPS Differential Code Bias Values", Presentation [online]. Revtrieved May 18, 2010. Retrieved from the internet: <http://nng.esoc.esa.de/ws2006/REPR2.pdf>, (May 8, 2006).

"International Search Report", PCT/US10/26509, (Apr. 20, 2010).

\* cited by examiner

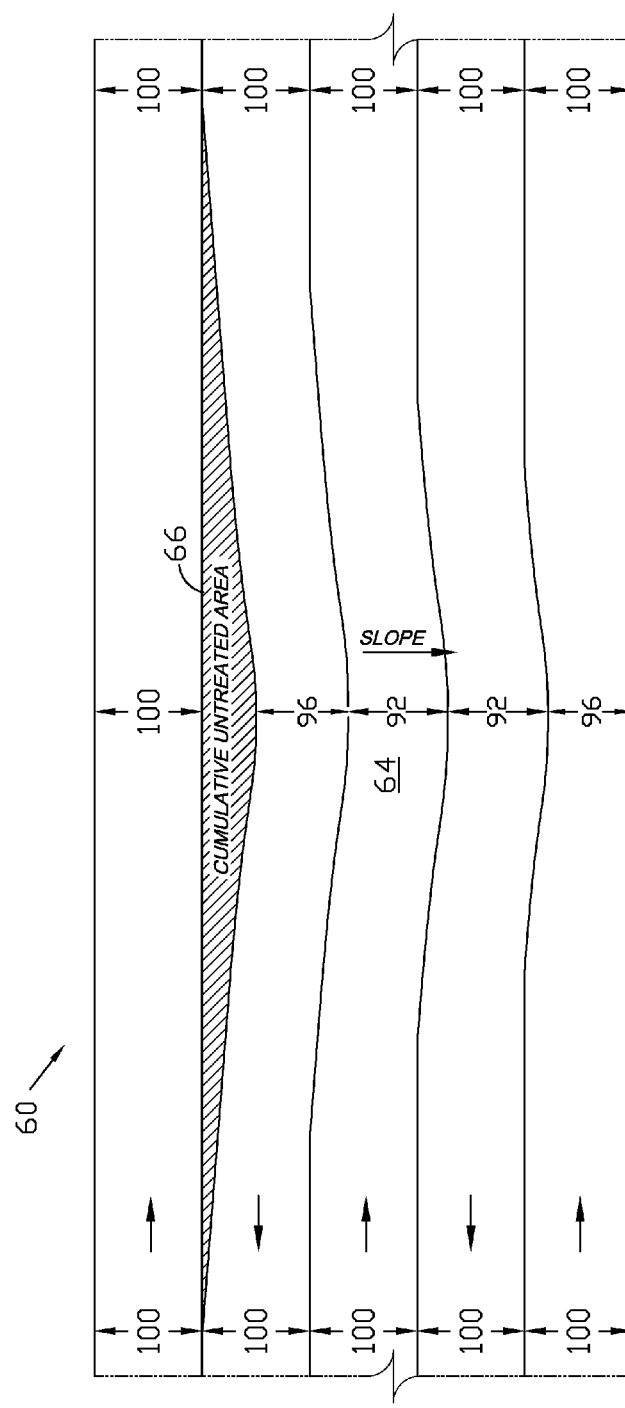

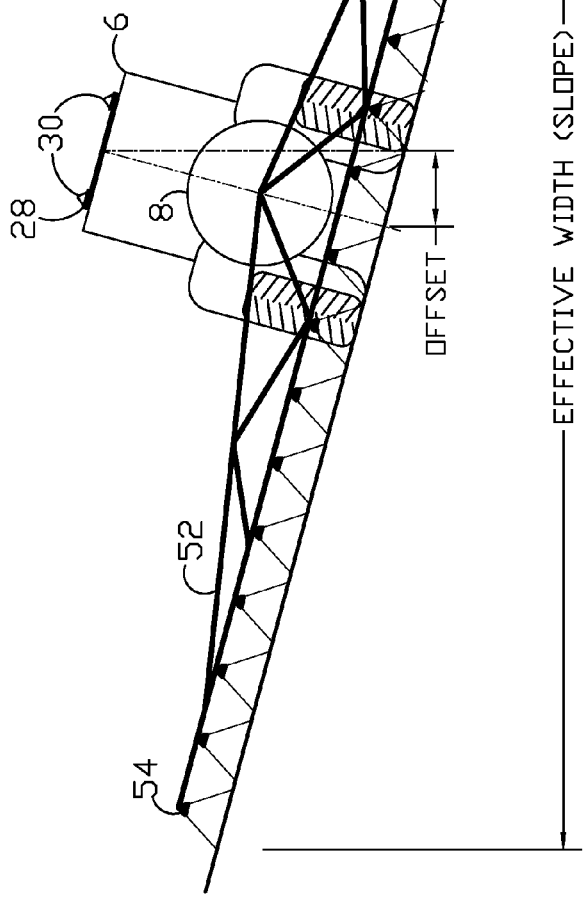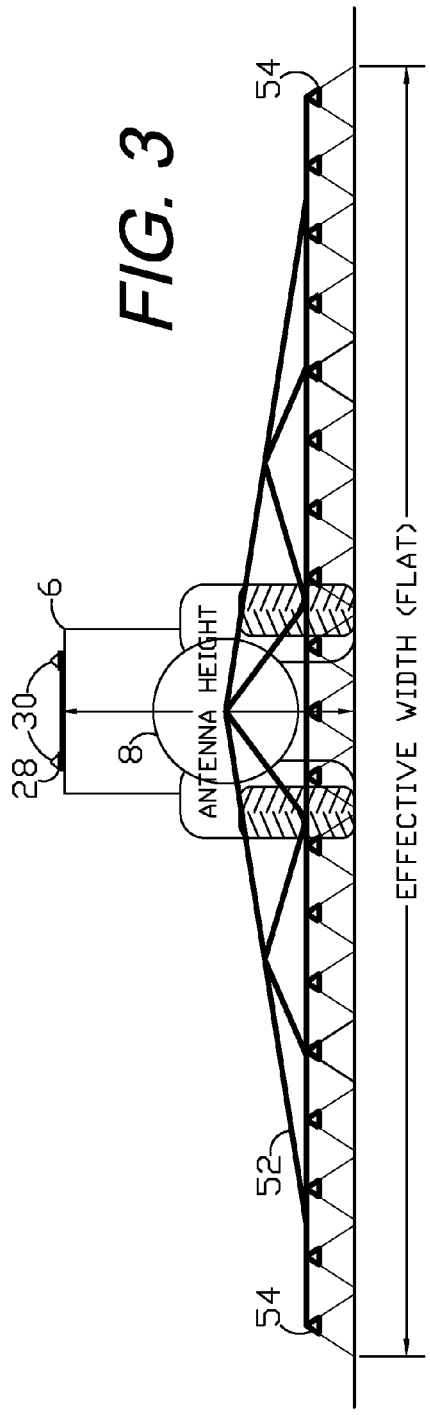

GNSS CONTROL SYSTEM AND METHOD

CROSS-REFERENCE TO RELATED APPLICATIONS

This application is a continuation-in-part and claims the benefit of: U.S. patent application Ser. No. 11/184,657, filed Jul. 19, 2005 now U.S. Pat. No. 7,689,354; which is a continuation-in-part and claims the benefit of U.S. patent application Ser. No. 10/875,776, filed Jun. 24, 2004, now U.S. Pat. No. 7,142,956, issued Nov. 28, 2006, which is a continuation-in-part and claims the benefit of U.S. patent application Ser. No. 10/804,721, filed Mar. 19, 2004 now U.S. Pat. No. 7,437,230, which claims the benefit of U.S. provisional application No. 60/456,130, filed Mar. 20, 2003; U.S. patent application patent application Ser. No. 10/804,758, filed Mar. 19, 2004 now U.S. Pat. No. 7,400,956, which claims the benefit of U.S. provisional application No. 60/456,146, filed Mar. 20, 2003; and U.S. patent application Ser. No. 11/650,784, filed Jan. 8, 2007 now U.S. Pat. No. 7,373,231; which is a continuation and claims the benefit of U.S. patent application Ser. No. 10/733,960, filed Dec. 11, 2003, now U.S. Pat. No. 7,162,348, issued Jan. 9, 2007, which claims the benefit of U.S. provisional application No. 60/432,719, filed Dec. 11, 2002; all of which are incorporated herein by reference in their entireties.

BACKGROUND OF THE INVENTION

1. Field of the Invention

The present invention relates generally to GNSS applications, including vehicle guidance and navigation.

2. Description of the Related Art

The use of a Global Navigation Satellite System (GNSS) for guidance, navigation and machine control has significantly advanced these fields and enabled a number of applications, including many in agriculture, transportation and other industries. GNSS systems include the Global Positioning System (GPS) and other satellite-based systems. Various GNSS receivers are available for aviation, marine and terrestrial vehicles. The GNSS information provided by such receivers can be processed and used for navigation. In more sophisticated systems, vehicle guidance can be automatically controlled using such information. For example, a predetermined travel or flight path can be programmed into an on-board computer. The vehicle guidance system can automatically maintain appropriate course parameters, such as course, heading, speed, altitude, etc. Control system, feedback theory and signal filtering techniques can be used to interactively anticipate (with higher order systems) and compensate for course deviations and navigation errors. Such sophisticated autopilot and automatic steering systems tend to involve powerful computers and complex flight and steering controls integrated with manual controls.

Accurate vehicle and equipment guidance is an important objective in agriculture. For example, cultivating, tilling, planting, spraying, fertilizing, harvesting and other farming operations typically involve specialized equipment and materials, which are operated and applied by making multiple passes over cultivated fields. Ideally, the equipment is guided through accurately-spaced passes or swaths, the spacing of which is determined by the swath width of the equipment. Gaps and overlaps can occur when operators deviate from the ideal guide paths, resulting in under-coverage and over-coverage respectively. Such gaps and overlaps are detrimental to agricultural operations and can reduce crop yields. For example, gaps in coverage reduce the effective areas of fields being cultivated and treated. Overall crop production may suffer as a result. Overlaps in coverage tend to be inefficient and wasteful of materials, such as fuel, fertilizer, pesticides, herbicides, seed, etc. Another potential problem with overlapping coverage relates to the potentially crop-damaging effects of double applications of certain agricultural chemicals.

Previous mechanical systems for assisting with the guidance of agricultural equipment include foam markers, which deposit foam along the swath edges. The foam lines produced by foam markers provide operators with visible reference lines on which subsequent passes can be aligned. However, foam marking systems consume foam-making materials and provide only temporary foam marks. Moreover, guiding along such foam lines requires the operators to visually estimate the locations of the implement ends relative to the foam lines. Implements such as spray booms with effective widths of more than 50 feet are in common use, thus increasing the difficulties associated with visually aligning distant, elevated boom ends with foam lines on the ground.

GNSS technology advanced the field of agricultural guidance by enabling reliable, accurate systems, which are relatively easy to use. GNSS guidance systems are adapted for displaying directional guidance information to assist operators with manually steering the vehicles. For example, the OUTBACK S™ steering guidance system, which is available from Hemisphere GPS LLC of Hiawatha, Kans. and is covered by U.S. Pat. No. 6,539,303 and No. 6,711,501, which are incorporated herein by reference, includes an on-board computer capable of storing various straight-line and curved ("contour") patterns. An advantage of this system is its ability to retain field-specific cultivating, planting, spraying, fertilizing, harvesting and other patterns in memory. This feature enables operators to accurately retrace such patterns. Another advantage relates to the ability to interrupt operations for subsequent resumption by referring to system-generated logs of previously treated areas.

The OUTBACK S™ GNSS guidance system provides the equipment operators with real-time visual indications of heading error with a steering guide display and crosstrack error with a current position display. They respectively provide steering correction information and an indication of the equipment position relative to a predetermined course. Operators can accurately drive patterns in various weather and light conditions, including nighttime, by concentrating primarily on such visual displays. Significant improvements in steering accuracy and complete field coverage are possible with this system.

Another type of GNSS vehicle guidance equipment automatically steers the vehicle along all or part of its travel path and can also control an agricultural procedure or operation, such as spraying, planting, tilling, harvesting, etc. Examples of such equipment are shown in U.S. Pat. No. 7,142,956, which is incorporated herein by reference. U.S. Patent Application Publication No. 2004/0186644 shows satellite-based vehicle guidance control in straight and contour modes, and is also incorporated herein by reference.

GNSS guidance systems and equipment are distinguished by their vehicle path configuration capabilities. Initially, straight-line AB (i.e. between points A and B) guidance consisted of multiple, parallel straight lines, which were separated by the swath widths of the vehicles. Straight line AB guidance is ideally suited for rectangular fields and continuously-repeating, parallel swathing.

Non-rectangular and terraced fields typically require curvilinear vehicle paths that follow the field perimeters and the terraced elevation contours. Contour guidance systems and methods were developed to accommodate such field conditions using GNSS coordinates to define curvilinear vehicle paths. See, for example, Korver U.S. Pat. No. 5,928,309. GNSS positions can be logged on-the-fly at intervals of, for example, 0.20 seconds. Contour guidance can be accomplished by computer-generating each subsequent pass from the GNSS-defined previous pass and a user-entered swath width.

Another type of GNSS contour guidance equipment outputs guidance signals relative to the edges of all previously logged swaths. Such logged swaths typically correspond to field areas where operations, e.g. spraying, have already been carried out.

A disadvantage with some of the previous GNSS guidance techniques relates to cumulative error propagation, which can result from machine or operator bias towards one side or the other of the vehicle path, or sloping terrain, which can reduce the effective width (as determined in a horizontal plane) of the implement. Significant cumulative guidance errors in the form of overlaps and skips can result from such biases being repeated over an entire field. Another disadvantage with some of the prior art guidance systems relates to their relatively heavy computer processing overhead demands. Multi-tasking guidance and other automated features, such as steering, tended to require relatively powerful on-board computers programmed with sophisticated software and equipped with large capacity memory devices, all of which tended to increase costs and complexity. Accordingly, an objective in automated vehicle guidance is to minimize the use of computer overhead, e.g. by actively guiding to a relatively small subset of the entire logged GNSS position database.

An objective in agricultural guidance is to accommodate both straight-line and contour field conditions. Another objective is to optimize track patterns to accommodate complex field configurations and terracing conditions whereby consistent swathing coverage can be achieved with minimum travel time and distance. Another objective is to accommodate sloping terrain with appropriate adjustments "on-the-fly". Still further, the system should be adapted for "desktop" preplanning and saving vehicle track patterns covering multiple fields for consistent coverage and repeatability. Automatic steering should be accommodated for "hands-off" operation, taking into account vehicle operating parameters, such as turning radii, speeds, swath widths, etc. Appropriate machine control functions, such as implement steering and spray boom control, should be accommodated.

Heretofore there has not been available a GNSS guidance and control system and method with the advantages and features of the present invention.

SUMMARY OF THE INVENTION

In the practice of the present invention, a GNSS system and method are provided for guiding and controlling equipment, such as agricultural equipment. The equipment can include a motive component, such as a tractor or other piece of equipment, which is designed to pull, push or otherwise transport a working component, such as a ground-working implement, in an articulated equipment system. Control can be based on GNSS positional data and various types of DGPS (Differential GPS) controls can be used, including WAAS and other suitable error-correction functionalities. A relatively simple configuration with a single DGPS antenna can be used, or multiple antennas can be used for additional information corresponding to machine orientation.

BRIEF DESCRIPTION OF THE DRAWINGS

FIG. 2B is another diagram of the field with the sloping area, showing the guide paths.

FIG. 3 is a rear elevational view of the vehicle and implement, shown on flat ground.

FIG. 4 is a rear elevational view of the vehicle and implement, shown tilted on sloping ground.

DETAILED DESCRIPTION OF THE PREFERRED EMBODIMENTS

I. Introduction and Environment

Figure 1:
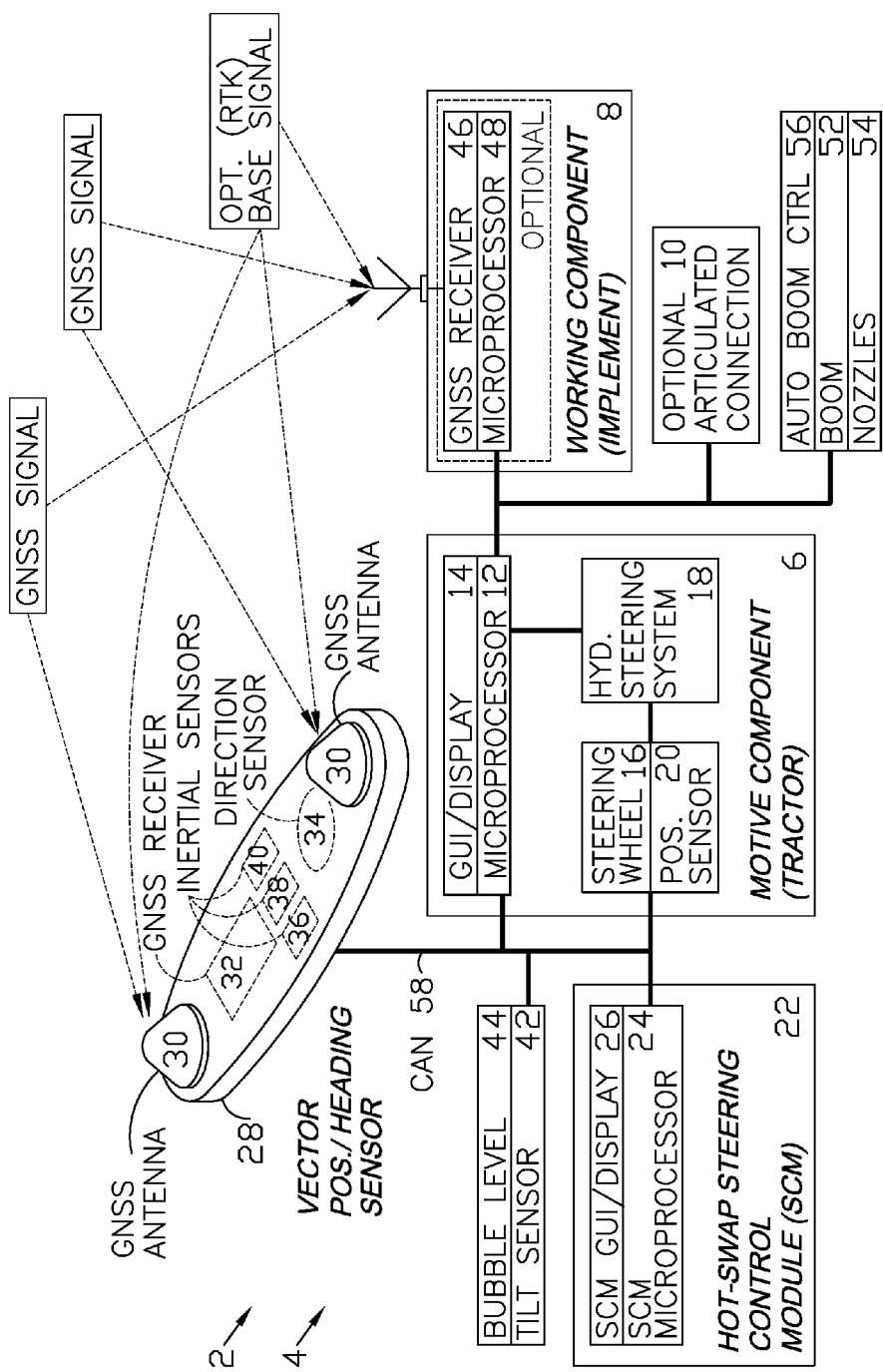
FIG. 1 is a block diagram of a GNSS-based control system embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning.

II. Preferred Embodiment System 2.

Referring to the drawings in more detail, the reference numeral 2 generally designates a GNSS control system embodying the present invention. Without limitation on the generality of useful applications of the control system 2, a motive component 6 connected to a working component 8 through an optional articulated connection or hitch 10 is shown (collectively a vehicle 4). Also by way of example, the motive component 6 can comprise a tractor and the working component 8 can comprise a ground-working implement. However, the position control system 2 can be applied to other equipment configurations for a wide range of other applications. Such applications include equipment and components used in road construction, road maintenance, earthworking, mining, transportation, industry, manufacturing, etc.

The control system 2 can be implemented with a tractor 6 including a microprocessor 12 connected to a graphical user interface (GUI) 14, which can be original equipment manufacture (OEM) general-purpose components, or special-purpose for the system 2. The tractor 6 also includes a steering wheel 16 for operating an hydraulic steering system 18. A position sensor 20 is connected to the steering wheel 16 and provides an output corresponding to its position. The components can be connected and external communication can be provided by suitable networks, buses, hardwired and wireless connections, such as CAN 58 (shown), serial and VT.

An optional steering control module (SCM) 22 includes a microprocessor 24 and a GUI 26, which can be preprogrammed and preconfigured for interfacing with the corresponding OEM components of the tractor 6. The SCM components can be removable and portable for use on multiple tractors 6, e.g. by "hot-swapping" the SCM 22 among various tractors 6 in a particular fleet. Such hot-swapping techniques can be particularly cost-effective in agricultural operations where application-specific equipment (e.g., harvesting combines, planters, sprayers, etc.) is idle much of the time and equipment usage tends to be somewhat seasonal. Alternatively, the microprocessors 12, 24 and the GUIs 14, 26 can be combined.

A position/heading (vector) sensor 28 can be mounted externally of the tractor 6, e.g. on its roof, and includes a pair of antennas 30 connected to a GNSS receiver 32. The GNSS receivers disclosed herein can be adapted for various satellite navigational systems, and can utilize a variety of Satellite Based Augmentation Systems (SBAS). Technology is also available for continuing operation through satellite signal interruptions, and can be utilized with the system 2. The antennas 30 can be horizontally aligned transversely with respect to a direction of travel of the tractor 6, i.e. parallel to its X axis. The relative positions of the antennas 30 with respect to each other can thus be processed for determining yaw, i.e. rotation with respect to the vertical Z axis. The sensor 28 also includes a direction sensor 34 and inertial sensors 36, 38 and 40 for detecting and measuring inertial movement with respect to the X, Y and Z axes corresponding to yaw, roll and pitch movements in six degrees of freedom. A tilt sensor 42 provides an output signal corresponding to a tilt or roll of the system 2. A bubble level 44 can be mounted in the tractor 6 for calibrating the tilt sensor 42, i.e. with no signal corresponding to the tractor 6 being level. Signals from the receiver 32 and the sensors 34, 36, 38, 40 and 42 are received and processed by either or both of the microprocessors 12, 24, depending upon how the system 2 is configured and programmed.

The implement (working component) 8 can optionally be equipped with an implement GNSS receiver 46 connected to an implement microprocessor 48 for steering the implement 8 independently of the tractor 6, for example with an optional articulated connection 10. Examples of such an articulated connection and an implement steering system are described in U.S. Pat. No. 6,865,465 and No. 7,162,348, which are incorporated herein by reference. The implement 8 can comprise any of a wide range of suitable implements, such as planting, cultivating, harvesting and spraying equipment. For example, spraying applications are commonly performed with a boom 52, which can be equipped for automatic, selective control of multiple nozzles 54 and other boom operating characteristics, such as height, material dispensed, etc. Automatic boom control 56 can be utilized, for example, to selectively activate and deactivate individual spray nozzles 54 whereby overspraying previously treated areas can be avoided by the system 2 keeping track of previously treated areas and turning off the nozzles 54 when those areas are reached in an overlapping swath situation, which occasionally occurs in connection with irregularly shaped parcels, near field boundaries and in other operating situations.

III. Operation and GNSS Method.

In operation, various guidance modes are available for adapting to particular field conditions. As used herein, guidance includes a graphical (visual, acoustic, etc.) interface with an operator in order to assist him or her in steering the tractor 6 and automatic steering without operator intervention. The system 2 is initialized to select operating modes and provide various information about the equipment, such as antenna height, swath width (generally corresponding to the width of the implement 8) and other operating variables. For example, the SCM 22 can be preprogrammed with a setup menu for selecting operating modes such as Straight AB (A=B) or Contour, which are described in U.S. application Ser. No. 10/804,721 (published as U.S. 2004/0186644).

The following Table 1 provides a partial listing of exemplary inputs (Data In) to the SCM control module 22 and outputs (Data Out). It will be appreciated that a wide range of data and information can be processed and utilized by SCM 22.

TABLE 1

| Data In | Data Out |
| --- | --- |
| Antenna height, enable/disable | Center position of vehicle lat, lon, alt, age, dop, stdev, DGPS heading, gyro heading, speed, tilt angle, crab angle, status (height, left/right corrected) |
| Vector to vehicle offset for guidance, vehicle X left, X right and Y controlled by boom control and roll and manual shift. Implement position for applications, vehicle X left, X right and Y controlled by boom control and roll and heading attitude error. External CAN based wheel sensor External boom control status Steering control and status Steering parameters needed by steering module, internal or external | Implement position (for application use) lat, lon of center, width Curvature, status |

Figure 2A:
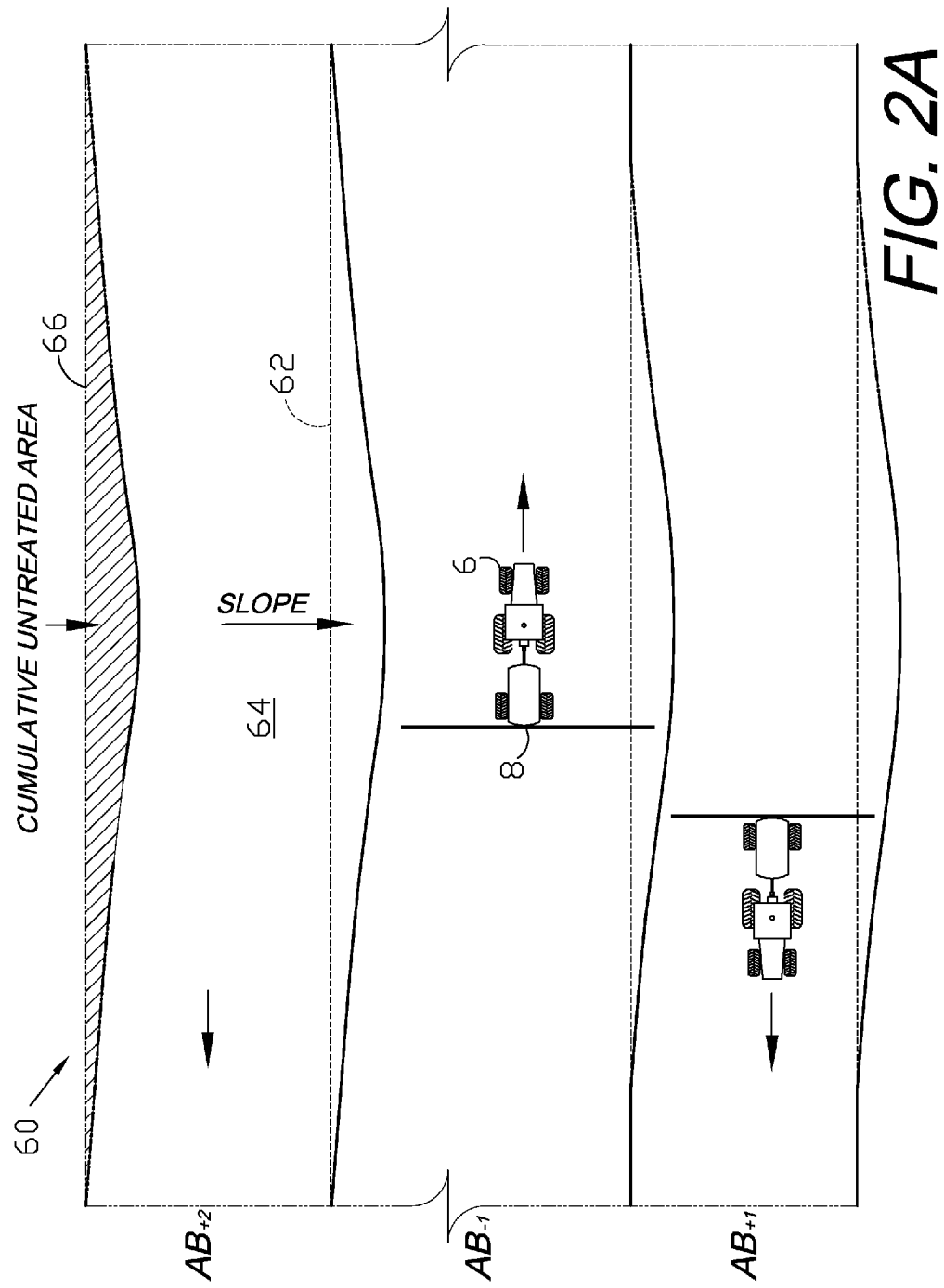
FIG. 2A is a diagram of a field with a sloping area and guide paths adjusted to accommodate the vehicle effective with corresponding to the vehicle tilt in the sloping area.

FIGS. 2A and 2B show a sloping field 60 wherein straight, parallel lines 62 defining the original guide paths traverse a sloping area 64. The system 2 detects a tilt sensor 42 signal, determines the tilt angle and compensates for the reduced effective swath width accordingly. Such detection and compensation steps can automatically occur "on-the-fly", i.e. without operator involvement. The resulting cumulative untreated area 66 can be treated when the operator resumes driving straight swaths, after completing normal swaths or when such fill-in operations are most convenient.

Figure 5:
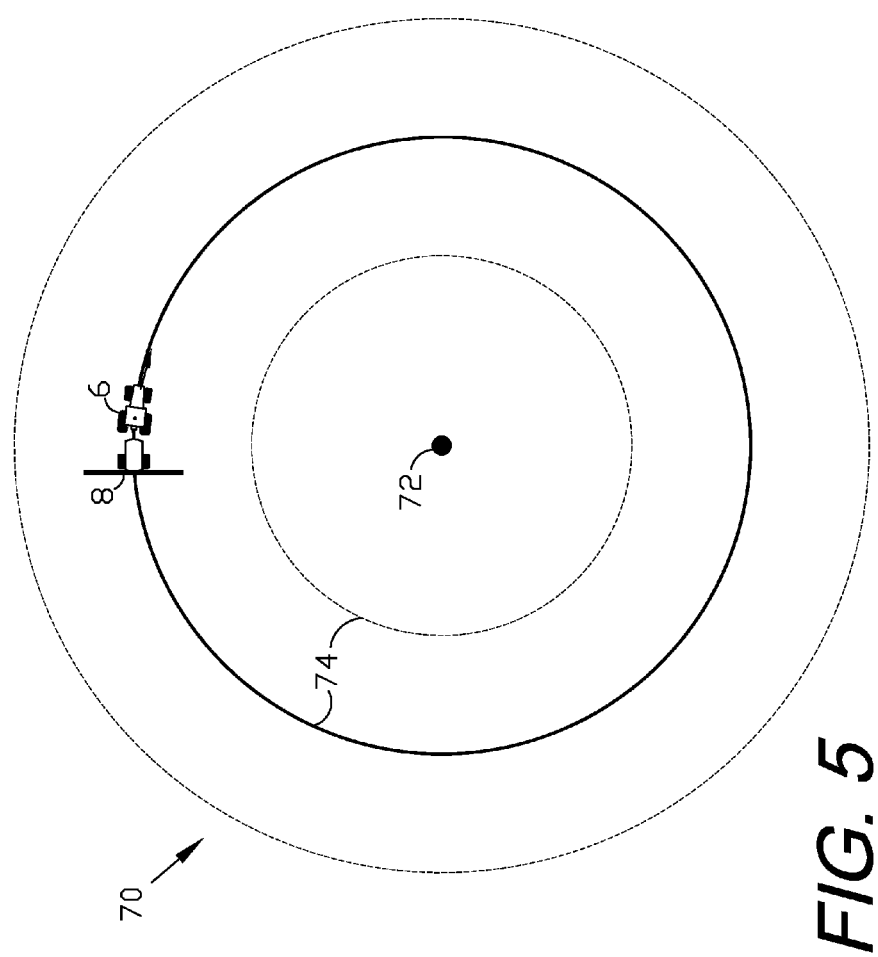
FIG. 5 is a diagram of a field with a center pivot irrigation system, showing concentric circle guide paths.

A Circle/Pivot guidance mode application is shown in FIG. 5 and is particularly suited for working in circular guide paths 74 in a field 70 with a center pivot irrigation system 72. A first pass is driven around a field to create a pivot log, and a "best-fit-circle" is calculated based on the pivot log. Parallel guidance passes (or guide paths) 74 are computed as concentric circles inside or outside of the best-fit-circle. Various other guide path configurations could be implemented, including spirals and irregular shapes, for example to accommodate irregular field shapes.

Figure 6:
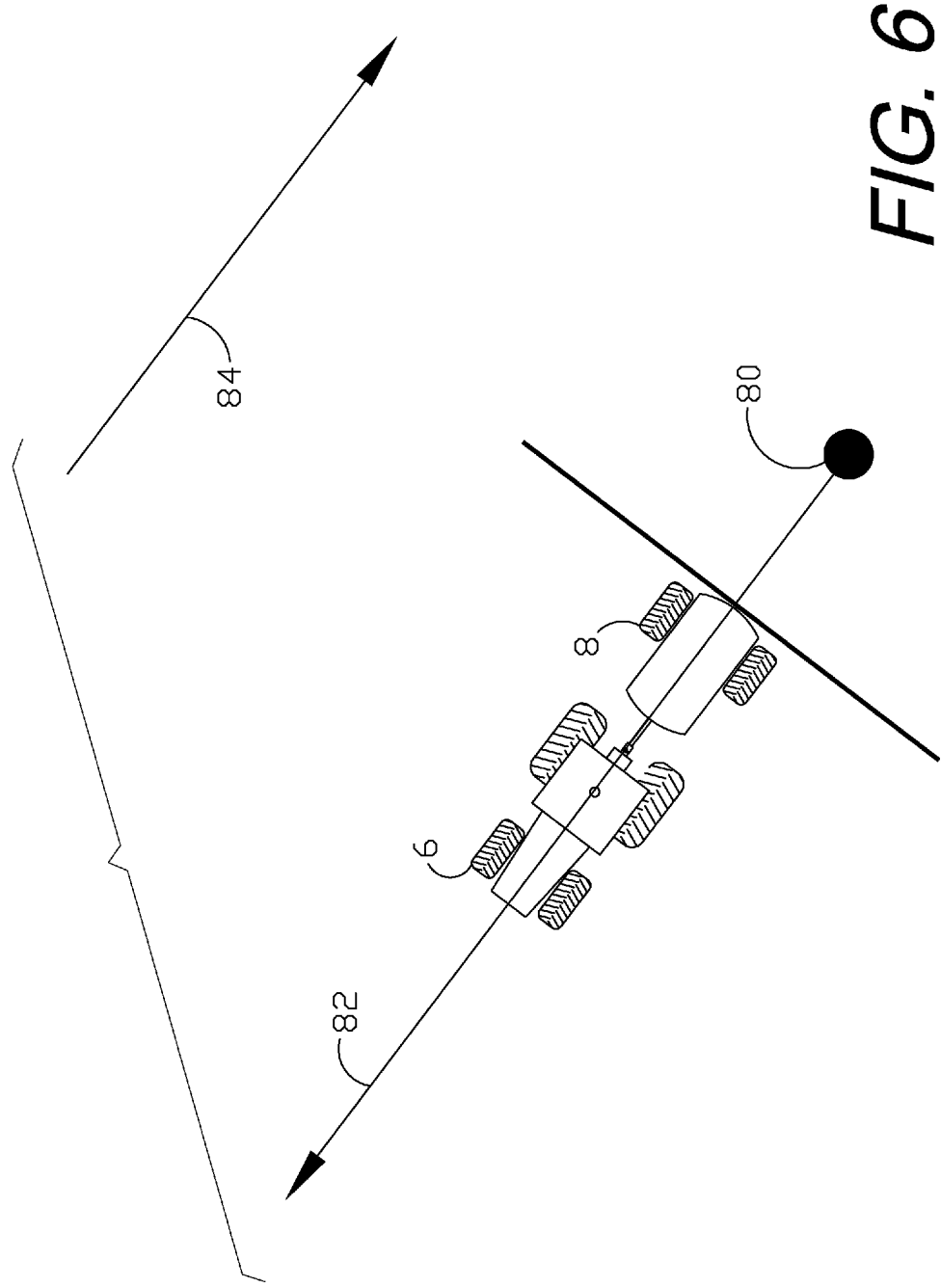
FIG. 6 is a diagram of a field, showing point (A)+direction guide paths.

Another guidance mode, which is designated A+Direction, is shown in FIG. 6 and utilizes a starting point 80 (e.g., "A") and a directional heading 82 in degrees or radians. This guidance method is particularly applicable to large fields where defining A and B may be inconvenient, and has the further advantage of being easy to reproduce throughout multiple seasons and operations. Subsequent headings or guide paths 84 can be calculated from the initial heading 82.

Other inputs can correspond to such operating variables and conditions as GUI brightness, system sensitivity, swath width, swath offset, headland alert, perimeter setup, correction type (e.g., SBAS, L-DIF, RTK, WAAS, etc.), automatic steering setup (e.g., vehicle type, sensitivity, dampening, steering speed, maximum turn rate, steering adjust, auto engage and diagnostics), alternative units of measure, alternative languages and alternative screen displays.

Figure 7:
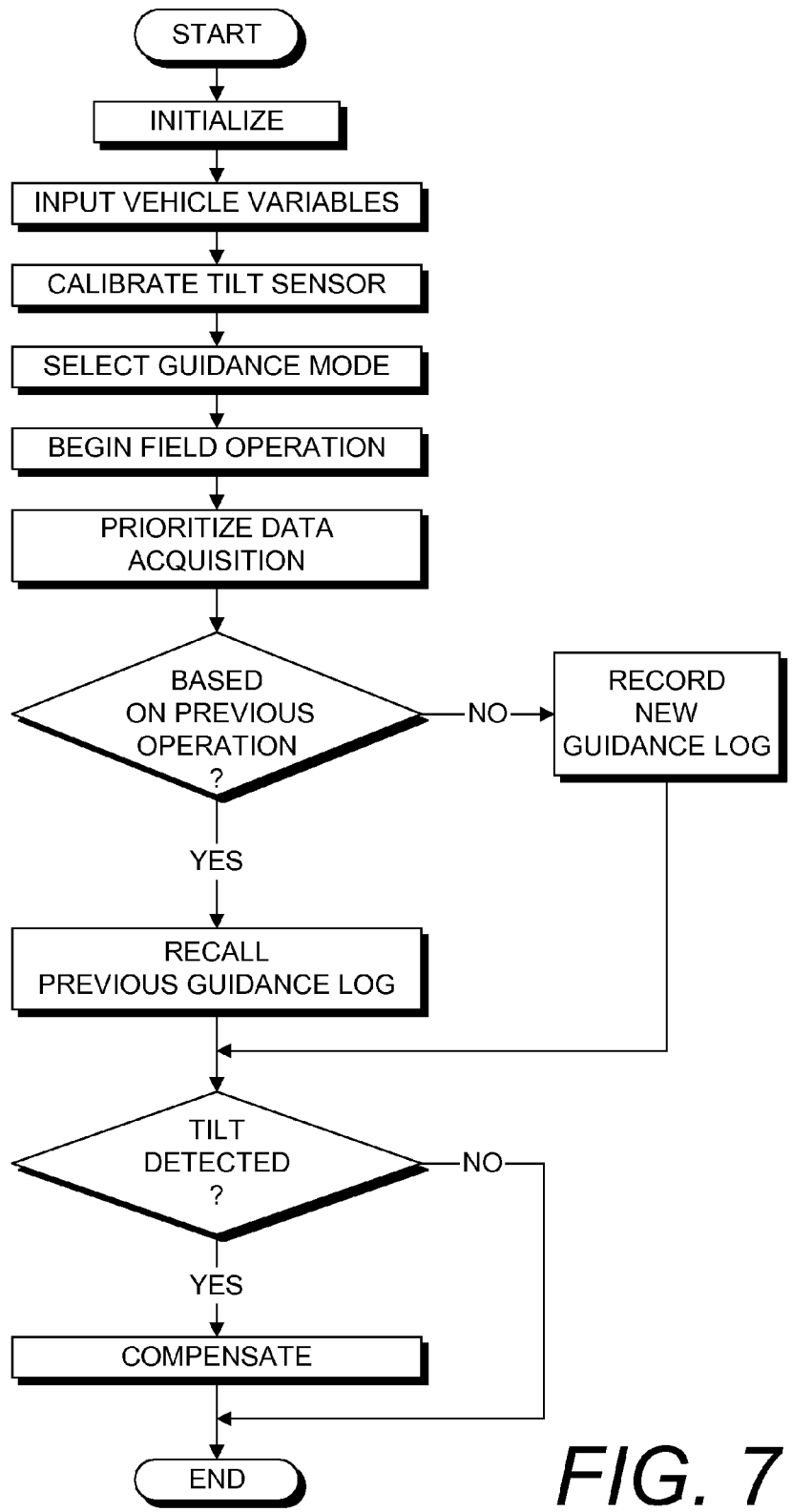
FIG. 7 is a flowchart of a GNSS control method according to an aspect of the present invention.

FIG. 7 is a flowchart showing the general operation of the system 2, commencing with start and initialized. Equipment values (which can include those described above) are input, the tilt sensor is calibrated and a guidance mode selected. Field operations can then begin. Data points can be acquired according to predetermined priority criteria, such as proximity to the tractor 6, most recently logged, corresponding to predetermined guide path, etc. For example, rapid acquisition techniques can be employed when the tractor turns around at the end of a row and preferably rapidly acquires the data points to continue guidance. If based on a previous operation, a stored guidance log can be recalled. Otherwise a new guidance log is recorded by logging the GPS points corresponding to the swaths driven by the equipment. If a tilt condition is detected, the system 2 can automatically initiate correction measures, as described above.

It is to be understood that the invention can be embodied in various forms, and is not to be limited to the examples discussed above. Other components can be utilized. For example, the working component can comprise a sprayer with spray booms connected to a vehicle and adapted to be raised and lowered in response to GNSS position data. Moreover, the GNSS control components, including receivers, sensors, antennas, etc., can be mounted on the tractor 6, the implement 8 or above with suitable communication between tractor and implement for independent automatic tractor/implement steering and control.

Having thus described the invention, what is claimed as new and desired to be secured by Letters Patent is:

1. A GNSS control system for a GNSS controlled vehicle, which control system comprises:
    a GNSS receiver associated with the controlled vehicle;
    multiple antennas associated with the controlled object and connected to the GNSS receiver;
    X, Y and Z axis inertial sensors associated with the controlled object and providing outputs corresponding to vehicle pitch, roll and yaw respectively;
    a direction sensor associated with the vehicle and determining its direction of travel;
    a control module connected to the receiver and the vehicle and adapted for controlling the vehicle in response to GNSS input;
    a GNSS control function associated with said control module;
    a guide function for covering a predetermined area with said vehicle;
    multiple guidance mode functions including: straight line (AB); contour; concentric circle; spiral and point A +direction;
    a function for detecting an end-of-swath turnaround of said vehicle;
    a function for prioritizing GNSS data acquisition in response to said vehicle turnaround whereby said GNSS control function acquires and guides said vehicle along a previous swath; and
    a function for continuing guidance during GNSS signal interruption using the output of said direction and inertial sensors for maintaining a predetermined path of travel of said vehicle.

2. The control system according to claim 1, which includes:
    said control module including a graphical user interface (GUI) and said GNSS control function including a guidance display on said GUI.

3. The control system according to claim 1, which includes said vehicle including a steering mechanism; and:
    said control module comprising a steering control module (SCM) connected to said vehicle steering mechanism and said GNSS control function including automatic steering of said vehicle.

4. The control system according to claim 3, which includes:
    said vehicle comprising a tractor and an implement connected thereto;
    a tilt sensor mounted on said vehicle and providing an output to said SCM corresponding to a tilting condition thereof; and
    a tilt correction function for compensating for a tilting condition of said vehicle.

5. The control system according to claim 4, which includes:
    said vehicle including a vehicle microprocessor and a vehicle graphical user interface (GUI) connected thereto; and
    said SCM including an SCM microprocessor connected to said vehicle microprocessor.

6. The control system according to claim 3, which includes:
    said vehicle steering mechanism including a steering wheel;
    a steering wheel position sensor connected to said steering wheel and providing an output corresponding to a steering wheel position; and
    said SCM receiving said steering wheel position sensor output and including a function for vehicle guidance based on a position of said steering wheel.

7. The control system according to claim 3, which includes:
    said SCM being adapted for hot swapping among multiple vehicles each having a control system with a microprocessor and a GUI; and
    said SCM being preprogrammed to interface with the respective control systems of multiple vehicles.

8. The control system according to claim 4, which includes:
    a bubble level mounted on said vehicle and adapted for calibrating said tilt sensor.

9. The control system according to claim 5, which includes:
    a function for compensating guidance for implement yaw.

10. The control system according to claim 5, which includes:
    a GNSS receiver mounted on said implement and communicating with said vehicle microprocessor;
    a function for steering said implement in response to GNSS signals received by said implement receiver;
    an articulated connection between said the tractor and said implement; and
    a positioning device for positioning said implement relative to said tractor.

11. The control system according to claim 4, which includes:
    said implement including a spray boom with multiple nozzles; and
    a function independently controlling said nozzles in response to a position of said implement.

12. A GNSS control system for a vehicle comprising a tractor and a towed implement connected to the tractor, which control system comprises:

a vector position/heading sensor mounted on said tractor and including: multiple antennas;
a GNSS receiver connected to said antennas; X, Y and Z axis inertial sensors providing outputs corresponding to vehicle pitch, roll and yaw respectively and a direction sensor;
a steering control module (SCM) including a microprocessor connected to and receiving the outputs from said sensors;
a function for automatically steering said vehicle;
a function for covering a predetermined area with said implement;
a function for logging GNSS data corresponding to area covered with said implement;
a tilt sensor mounted on the vehicle and providing an output to said microprocessor corresponding to a tilting condition of said vehicle;
a tilt correction function for compensating for a tilting condition of said vehicle;
multiple guidance mode functions including one or more from the group consisting of:
straight line (AB); contour; concentric circle; spiral and point A +direction;
a GNSS receiver mounted on said implement and communicating with said microprocessor;
a function for steering said implement in response to GNSS signals received by said implement receiver;
an articulated connection between said the tractor and said implement;
a positioning device for positioning said implement relative to said tractor;
said implement including a spray boom with multiple nozzles;
a function independently controlling said nozzles in response to a position of said implement;
said vehicle including a steering wheel and a steering wheel position sensor providing an output corresponding to a steering wheel position;
said SCM receiving said steering wheel position sensor output and including a function for guiding based on a position of said steering wheel;
a function for detecting an end-of-swath turnaround of said vehicle;
a function for prioritizing GNSS data acquisition in response to a vehicle turnaround; and
a function for continuing guidance during GNSS signal interruption using the output of said inertial and direction sensors for maintaining a predetermined path of travel of said object.

13. A GNSS method for guiding a vehicle including a motive component and a working component connected by an articulated connection, which method comprises the steps of:
providing said vehicle with a vehicle control system including a microprocessor and a GUI;
mounting a vector position/heading sensor on said motive component and providing said vector position/heading sensor with: multiple antennas; a GNSS receiver connected to said antennas; X, Y and Z axis inertial sensors providing outputs corresponding to vehicle pitch, roll and yaw respectively;
and a direction sensor providing an output corresponding to said vehicle direction of travel;
providing a steering control module (SCM) including a microprocessor and a GUI connected thereto;
connecting the outputs from said inertial sensors to said SCM;
providing a tilt sensor on said motive component;
providing a tilt sensor output corresponding to a tilt of said motive component to said SCM microprocessor;
adjusting a swath width of said working component based on said tilt sensor output;
providing said SCM with guidance modes including one more from the group consisting of: straight line (AB); contour; concentric circle; spiral and point A+direction;
logging GNSS data with said vector position/heading sensor and said SCM microprocessor; automatically steering said motive component in one of said guidance modes based on said logged GNSS data;
providing said working component with a spray boom including multiple spray nozzles;
selectively and automatically controlling the operation of said spray nozzles in response to a location of said working component as determined from GNSS logged data; and
continuing guidance during GNSS signal interruption using the output of said inertial and direction sensors for maintaining a predetermined path of travel of said object.

\* \* \* \* \*